United States Patent [19]

Spoetter

[11] Patent Number: 5,065,725
[45] Date of Patent: Nov. 19, 1991

[54] PRESSURE CONTROL VALVE, IN PARTICULAR FOR FUEL INJECTION SYSTEMS

[75] Inventor: Detlef Spoetter, Korntal, Fed. Rep. of Germany

[73] Assignee: Robert Bosch GmbH, Stuttgart, Fed. Rep. of Germany

[21] Appl. No.: 640,347

[22] Filed: Jan. 11, 1991

[30] Foreign Application Priority Data

Mar. 30, 1990 [DE] Fed. Rep. of Germany ....... 4010173

[51] Int. Cl.$^5$ ............................................. F02M 41/00
[52] U.S. Cl. .................................. 123/463; 123/447; 123/456; 137/510
[58] Field of Search ............... 123/467, 447, 463, 456, 123/506; 137/510, 115, 116

[56] References Cited

U.S. PATENT DOCUMENTS

| 3,155,366 | 11/1964 | Rasmussen | 137/510 |
| 4,205,637 | 6/1980 | Ito | 123/456 |
| 4,357,921 | 11/1982 | Ciaccio | 123/463 |
| 4,537,387 | 8/1985 | Danby | 137/510 |
| 4,625,695 | 12/1986 | Tuckey | 123/463 |
| 4,635,537 | 1/1987 | Field | 137/510 |
| 4,679,537 | 7/1987 | Fehrenbach | 123/447 |
| 4,756,289 | 7/1988 | Rock | 123/467 |
| 4,825,835 | 5/1989 | Deweerdt | 123/463 |
| 4,903,721 | 2/1990 | Maier | 123/463 |
| 4,996,963 | 3/1991 | Fehrenbach | 123/447 |

FOREIGN PATENT DOCUMENTS

| 89182 | 10/1958 | Netherlands | 137/510 |
| 7608044 | 2/1977 | Netherlands | 137/510 |
| 101078 | 3/1917 | United Kingdom | 137/510 |
| 1186970 | 4/1970 | United Kingdom . | |

Primary Examiner—Carl S. Miller
Attorney, Agent, or Firm—Edwin E. Greigg; Ronald E. Greigg

[57] ABSTRACT

A pressure control valve suitable for liquid or gaseous media with a short force conduction path is to be created, permitting the use of plastic as a material for the housing. The pressure control valve has a chamber carrying the medium, which is formed by a housing element and a diaphragm. A seat valve located in the chamber has a valve closing element secured to the diaphragm. A prestressed spring disposed in the chamber at least indirectly engages the housing part on one side and the valve closing element on the other. The spring acting as a tension spring is in the form of an annular washer and occupies little space. The pressure control valve is intended for liquid or gaseous media, and in particular for use in fuel injection systems of internal combustion engines.

20 Claims, 2 Drawing Sheets

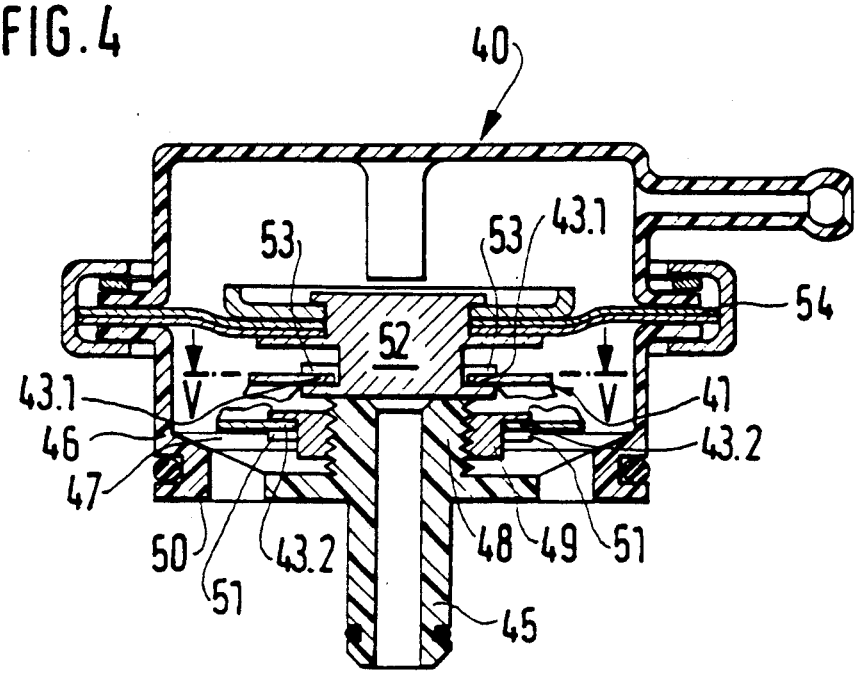
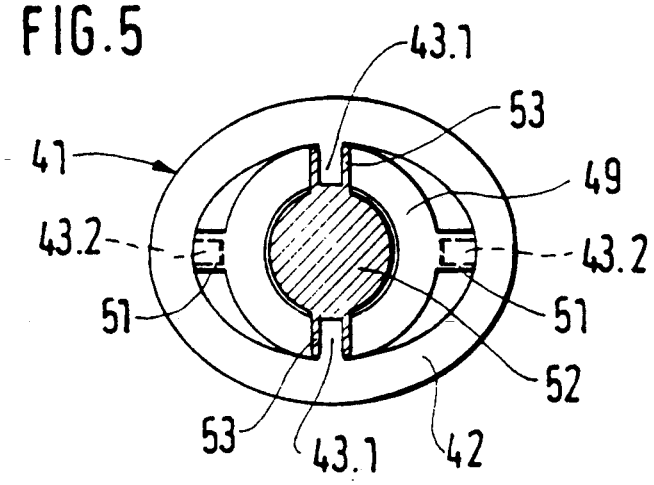

PRESSURE CONTROL VALVE, IN PARTICULAR FOR FUEL INJECTION SYSTEMS

BACKGROUND OF THE INVENTION

The invention is directed to improvements in a pressure control valve for liquid or gaseous media, in particular for fuel injection systems of internal combustion engines.

A pressure control valve is already known (German Offenlegungsschrift 16 50 297), in which the spring is located in a second, cup-shaped housing part. This part is connected to the first housing part by a crimped rim in which the rim of a diaphragm is fastened. The spring is supported with prestressing indirectly on the bottom of the second housing part, on the one hand, and on the other hand on the valve closing element. The spring is embodied as a helical compression spring and occupies considerable space. The pressure control valve therefore has a relatively great axial length. This also makes the force conduction path long, because it extends over the entire length of both housing parts. In the known pressure control valve, it is accordingly necessary to make the housing parts of steel, to keep the changes in the adjusted control value dictated by thermal expansion low.

OBJECT AND SUMMARY OF THE INVENTION

It is a principal object of the pressure control valve according to the invention the advantage over the prior art that the force conduction path is shortened considerably. Materials such as plastics that have a higher thermal expansion coefficient than steel can therefore be used for the housing part, without substantially impairing the quality of control. By using injection-moldable plastics, for instance, for the housing part considerable advantages in terms of manufacturing economy are attainable.

It is another object to provide a particularly small axial length of the housing part which can be attained in one embodiment because a spring embodied in this way has a small axial extension.

It is still another object to provide an embodiment which relates to force conduction from the spring to the housing part or to the neck and valve closing member. In this embodiment a symmetrical, largely moment-free connection between the spring and the aforementioned components is attained, which is similar to a gimbal suspension and promotes mobility of the valve closing member, so that it is seated securely on the valve seat.

In yet another object of the invention, one which is especially advantageous, the valve closing element and the neck that has the valve seat adjoin one another directly, so that the force conduction path is very short.

In yet a further object of the invention a simple adjustment of the spring force is possible.

In yet another additional object, an embodiment is disclosed which is advantageous because it provides for a secure, form-fitting engagement of the spring.

In still another object of the invention, it becomes possible to attain a large flow through the seat valve with a small allowable spring path, because the contour of the valve seat has a relatively large circumferential length.

The invention will be better understood and further objects and advantages thereof will become more apparent from the ensuing detailed description of preferred embodiments taken in conjunction with the drawings.

BRIEF DESCRIPTION OF THE DRAWINGS

FIG. 4 is a longitudinal section through a pressure control valve similar to that shown in FIG. 1, with a spiral spring in the form of a circular disk that engages the valve closing element of a seat valve and indirectly engages a neck, as the second exemplary embodiment; and FIG. 5 is a cross section through the valve closing element and spring taken along the line V—V of FIG. 4.

DESCRIPTION OF THE PREFERRED EMBODIMENTS

Figure 1:
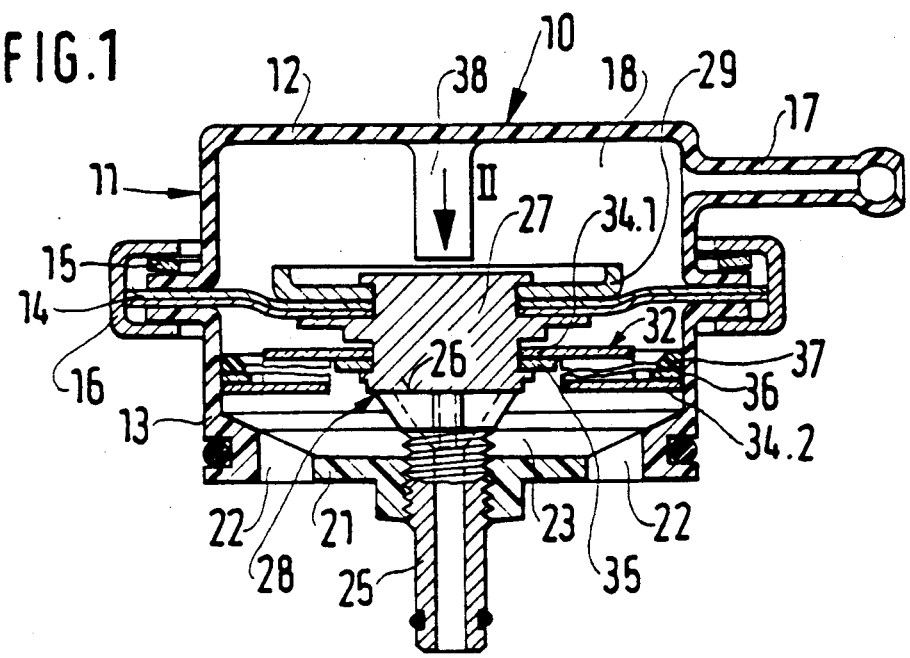
FIG. 1 is a longitudinal section through a pressure control valve having a spiral spring in the form of an annular disk that engages a housing part on one side and engages a valve closing element of a seat valve on the other side, as the first exemplary embodiment.

The pressure control valve 10 shown in FIG. 1 in the first exemplary embodiment is intended for use in fuel injection systems of internal combustion engines. The pressure control valve 10 has a housing 11 comprising an upper housing part 12 and a lower housing part 13. The two housing parts 12 and 13, made of plastic, are cup-shaped and are tightly joined together along their flange-like opening rim with a crimped ring 16, with two congruent diaphragms 14 and a cup spring 15 disposed between them. The upper housing part 12 has a connection neck 17 that can be connected to the intake tube of the engine, not shown. In combination with the diaphragms 14, the upper housing part 12 therefore defines a negative-pressure chamber 18.

The lower housing part 13 has a bottom 21 with a plurality of inlet openings 22 for fuel. In combination with the diaphragms 14, the lower housing part 13 thus forms a chamber 23 that carries fuel.

A tubular neck 25 protruding into the chamber 23 is screwed into the bottom 21 of the housing part 13. Its end face toward the chamber has a valve seat 6, to which a valve closing element 27 is assigned. The valve seat 26 and the valve closing element 27 form a seat valve 28. The valve closing element 27 is joined to the diaphragms 14 by a plate washer 29.

Figure 2:
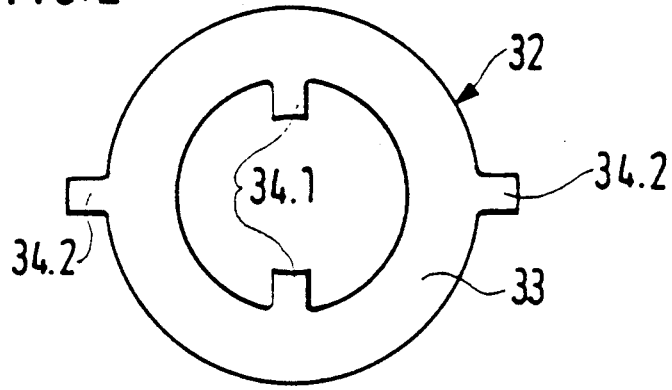
FIG. 2 shows the outline of the spring seen in the direction of the arrow II of FIG. 1.

A tension spring 32 is received in the fuel-carrying chamber 23 with prestressing. It comprises a spiral spring and has four fastening tongues 34.1 and 34.2 (see FIG. 2) protruding radially on its circumference from its spring body 33, of circular annular shape. The fastening tongues, distributed at uniform intervals, are alternatingly disposed, one on the outer circumference and the other on the inner circumference of the spring body 33. They accordingly form pairs of diametrically opposed fastening tongues 34.1 and 34.2. The fastening tongues 34.1 located on the inside are supported on the valve closing element 27, with the interpositon of an annular washer 35. (In FIG. 1, the fastening tongues 34.2 are shown offset by 90°.) The outer fastening tongues 34.2, contrarily, engage a plastic ring 37, which is flush-fitting with, and fastened to, the inner circumferential wall of the lower housing part 13, and an annular washer 36 is disposed between this ring 37 and the outer fastening tongues 34.2.

The purpose of the pressure control valve 10 is to regulate the pressure in the fuel injection system as a function of the pressure in the intake tube. If the set pressure is exceeded, the diaphragm-controlled valve closing element 27 opens the valve seat 26 of the seat valve 28, so that excess fuel supplied through the tubular neck 25 can flow back without pressure to a fuel tank, not shown. Setting of the pressure can be done in the course of assembly of the pressure control valve 10, by axially displacing the ring 37 before it is joined to the housing part 13. Another option for adjustment is axial adjustment of the tubular neck 25.

Figure 3:
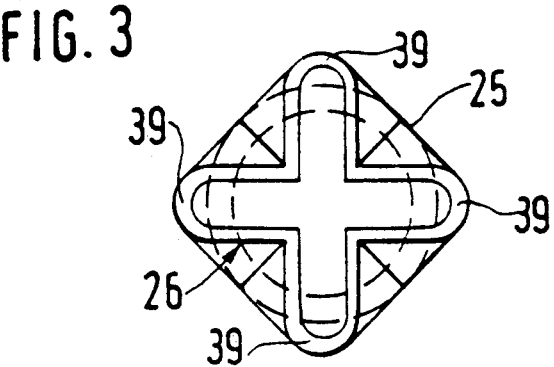
FIG. 3 is a view of the valve seat of the seat valve, again in the direction of the arrow II of FIG. 1, on a different scale.

The stroke of the valve closing element 27 is a few tenths of a millimeter long. Since pressure surges in the supply of fuel to the chamber 23 can cause damaging overstrokes, however, a stroke-limiting stop protrusion 38 is disposed on the upper housing part 12. Nevertheless, if one assumes a characteristic curve of the spring 32 that is useful within particularly narrow limits, to achieve adequately large flow cross sections of the seat valve 28, a valve seat shape with a contour the shape of a hollow cross has been found particularly useful. Such version is shown in FIG. 3, with the arms 39 of the cross protruding beyond the outside diameter of the segment of the tubular neck 25 toward the chamber. Other possible contours are also suitable for enlarging the cross section, however.

As described above, the spring 32 engages the valve closing element 27 and the lower housing part 13 indirectly, in the manner of a gimbal suspension. The force conduction path is therefore relatively short: First, it leads via the inner fastening tongues 34.1 and the annular washer 35 to the valve closing element 27; second, the force of the spring 32 is transmitted via the outer fastening tongues 34.2 to the annular washer 36, the ring 37, the housing part 13, and from there via the neck 25 to the valve seat 26.

A still shorter force conduction path is attainable in an embodiment of a pressure control valve 40 shown in FIG. 4. To this end, the pressure control valve 40 has a spring 41 with a washer-like spring body 42 of elliptical shape. Fastening tongues 43.1 and 43.2 extending radially inward extend at uniform intervals from its inner circumference. Once again they form pairs of diametrically opposed fastening tongues 43.1 and 43.2.

A tubular neck 45 for excess fuel is formed directly onto the lower housing part 46 of the pressure control valve 40. An axially adjustable bushing 49 is screwed onto a segment 48 of the neck that protrudes into the fuel-carrying chamber 47. This bushing has two diametrically opposed pocket-like attachments 51, open toward the bottom 50 of the housing part 46, and the fastening tongues 43.2 of the spring 41 fittingly engage the inside of these pockets. The valve closing element 52 of the pressure control valve 40 is likewise provided with two diametrically opposed pocket-like attachments 53, which are open toward the diaphragms 54 of the pressure control valve 40. The attachments 53 of the valve closing element 52 are intended for receiving the fastening tongues 43.1 of the spring 41 in a positionally fixing manner. (The pocket-like attachments 53 disposed on the valve closing element 52 and the fastening tongues 43.1 that engage them are shown offset by 90° in FIG. 4.) Otherwise the pressure control valve 40 is embodied largely identically to that of FIG. 1.

In the assembly of the pressure control valve 40, the initial stress of the spring 41 is adjustable by axial displacement of the bushing 49. Once the stress has been set, the bushing 49 can be fixed in place. The force conduction path extends from the spring 41, on the one hand via the fastening tongues 43.1 to the valve closing element 52 and on the other via the fastening tongues 43.2 to the bushing 49, and from it to the segment 48 of the tubular neck 45. Differing from this embodiment of the pressure control valve 40, it is also possible to equip either the housing part 46 or the segment 48 of the tubular neck 45 with pocket-like attachments for engagement by the spring 41. In that case, other provisions for adjusting the pressure control valve must be selected.

Because of the positional fixation of its fastening tongues 43.1 and 43.2 in the pocket-like attachments 51 and 53, the spring 41 can also be used to center the valve closing element 52 with the diaphragms 54 in the housing part 46 during the process of assembly of the pressure control valve 40.

The pressure control valves 10 and 40 described are suitable not only for liquid media but also for gaseous media.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure control valve (10; 40) for liquid or gaseous media, in particular for fuel injection systems of internal combustion engines, comprising first and second housing elements forming a housing, said second housing element (13, 46) and at least one diaphragm (14, 54) defining a chamber (23; 47) for receiving said media; said second housing part provided with, a tubular neck (25; 45) communicating there with and protruding into the chamber (23; 47), said tubular neck provided with an end face oriented toward the chamber forming a valve seat (26) for a feed valve (28); said feed valve (28) provided with a valve closing element (27; 52) secured at least indirectly to the diaphragm (14; 54), a pre-stressed spring (32; 41) at least indirectly engaging the second housing element (13; 46) on one side and the valve closing element (27; 52) on the other, said spring (32; 41) comprising a tension spring disposed in the chamber (23; 47) carrying the medium.

2. A pressure control valve as defined by claim 1, further comprising the spring (32; 41) is a spiral spring in the form of an annular washer, and in the circumferential direction the spring at least indirectly engages the second housing element (13; 46) and the valve closing element (27; 52) in alternation.

3. A pressure control valve as defined by claim 2, further comprising the spring (32; 41) is provided with fastening tongues (34.1, 34.2; 43.1, 43.2) protruding radially from inner and outer circumferential walls of its annular-washer-like spring body (33; 42), for at least indirect transmission of force onto the second housing element (13 46) and the valve closing element (27; 52).

4. A pressure control valve as defined by claim 3, further comprising said fastening tongues comprise at least four fastening tongues (34.1, 34.2; 43.1, 43.2) disposed, preferably at uniform intervals, in a diametrically opposed manner for at least indirect engagement with the second housing element (13; 46) and the valve closing element (27; 52).

5. A pressure control valve as defined by claim 4, further comprising at least some of said fastening tongues (34.2) protrude radially outward from the annular-washer-like spring body (33) to engage from behind a ring (37) disposed against an inside circumferential wall of the second housing element (13) and other of said fastening tongues (34.1) radially inward from the spring body (33) to be retained, in a force-locking manner on the valve closing element (27).

6. A pressure control valve as defined by claim 4 further comprising the spring (41) has at least two paris of fastening tongues each pair (43.1, 43.2) disposed in diametrically opposed relation to protrude radially inward from the spring body (42), of which at least two diametrically opposed fastening tongues (43.2) at least indirectly engage the tubular neck (45) and at least two other diametrically opposed fastening tongues (43.1) engage the valve closing element (52).

7. A pressure control valve as defined by claim 5, further comprising the tubular neck (25) is axially displaceably guided in the second housing element (13).

8. A pressure control valve as defined by claim 6, further comprising the tubular neck (25) is axially displaceably guided in the second housing element (13).

9. A pressure control valve as defined by claim 6, further comprising the tubular neck (45) is positively disposed with respect to the second housing element (46) and oriented toward the chamber, said neck is provided with an axially displaceable bushing (49) engaged by the spring with fastening tongues (43.2).

10. A pressure control valve as defined by claim 4, further comprising at least on of the valve closing element (52), the second housing element (46), the tubular neck (45) and the bushing (49) is equipped with pocket-like attachments (51 53) protruding radially from a circumferential wall thereof, an inside portion of which attachments is engaged by the fastening tongues (43.1, 43.2) of the spring (41).

11. A pressure control valve as defined by claim 5, further comprising at least one of the valve closing element (52.), the second housing element (46), the tubular neck (45) and the bushing (49) is equipped with pocket-like attachments (51, 53) protruding radially from a circumferential wall thereof, an inside portion of which attachments is engaged by the fastening tongues (43.1, 43.2) of the spring (41).

12. A pressure control valve as defined by claim 6, further comprising at least one of the valve closing element (52), the second housing element (46), the tubular neck (45) and the bushing (49) is equipped with pocket-like attachments (51, 53) protruding radially from a circumferential wall thereof, an inside portion of which attachments is engaged by the fastening tongues (43.1, 43.2) of the spring (41).

13. A pressure control valve as defined by claim 9, further comprising at least one of the valve closing element (52), the second housing element (46), the tubular neck (45) and the bushing (49) is equipped with pocket-like attachments (51, 53) protruding radially from a circumferential wall thereof, an inside portion of which attachments is engaged by the fastening tongues (43.1, 43.2) of the spring (41).

14. A pressure control valve as defined by claim 1, further comprising the valve seat (26) is provided with a contour shaped as a hollow cross provided with arm portions having a greater longitudinal extent than the tubular neck (25), whereby tips of said arms extend beyond a diametrical extent of said valve seat.

15. A pressure control valve as defined by claim 2, further comprising the valve seat (26) is provided with a contour shaped as a hollow cross provided with arm portions having a greater longitudinal extent than the tubular neck (25), whereby tips of said arms extend beyond a diametrical extent of said valve seat.

16. A pressure control valve as defined by claim 3, further comprising the valve seat (26) is provided with a contour shaped as a hollow cross provided with arm portions having a greater longitudinal extent than the tubular neck (25), whereby tips of said arms extend beyond a diametrical extent of said valve seat.

17. A pressure control valve as defined by claim 4, further comprising the valve seat (26) is provided with a contour shaped as a hollow cross provided with arm portions having a greater longitudinal extent than the tubular neck (25), whereby tips of said arms extend beyond a diametrical extent of said valve seat.

18. A pressure control valve as defined by claim 5, further comprising the valve seat (26) is provided with a contour shaped as a hollow cross provided with arm portions having a greater longitudinal extent than the tubular neck (25), whereby tips of said arms extend beyond a diametrical extent of said valve seat.

19. A pressure control valve as defined by claim 7, further comprising the valve seat (26) is provided with a contour shaped as a hollow cross provided with arm portions having a greater longitudinal extent than the tubular neck (25), whereby tips of said arms extend beyond a diametrical extent of said valve seat.

20. A pressure control valve as defined by claim 8, further comprising the valve seat (26) is provided with a contour shaped as a hollow cross provided with arm portions having a greater longitudinal extent than the tubular neck (25), whereby tips of said arms extend beyond a diametrical extent of said valve seat.

* * * * *